(12) United States Patent
Stolboushkin et al.

(10) Patent No.: US 11,578,546 B2
(45) Date of Patent: Feb. 14, 2023

(54) SELECTIVE FLOW CONTROL USING CAVITATION OF SUBCOOLED FLUID

(71) Applicants: Eugene Stolboushkin, Houston, TX (US); Alexander Kendall, Houston, TX (US); Corinne Graffagnino, Houston, TX (US)

(72) Inventors: Eugene Stolboushkin, Houston, TX (US); Alexander Kendall, Houston, TX (US); Corinne Graffagnino, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 230 days.

(21) Appl. No.: 16/998,149

(22) Filed: Aug. 20, 2020

(65) Prior Publication Data

US 2021/0238939 A1    Aug. 5, 2021

Related U.S. Application Data

(60) Provisional application No. 62/903,502, filed on Sep. 20, 2019.

(51) Int. Cl.
*E21B 43/24* (2006.01)
*E21B 21/08* (2006.01)
*F24T 10/15* (2018.01)
*F15D 1/06* (2006.01)

(52) U.S. Cl.
CPC .......... *E21B 21/08* (2013.01); *E21B 43/2406* (2013.01); *F15D 1/06* (2013.01); *F24T 10/15* (2018.05)

(58) Field of Classification Search
CPC ....... E21B 43/2406; E21B 43/12; F24T 10/15
See application file for complete search history.

(56) References Cited

U.S. PATENT DOCUMENTS

| 3,238,960 | A  | * | 3/1966  | Hatch, Jr. ................. | F15C 1/14 |
|---|---|---|---|---|---|
|  |  |  |  |  | 137/810 |
| 9,022,119 | B2 |   | 5/2015  | Sims |  |
| 9,506,320 | B2 | * | 11/2016 | Dykstra ................... | E21B 43/14 |
| 9,638,000 | B2 | * | 5/2017  | Dyck ....................... | E21B 43/12 |
| 10,214,991 | B2 | * | 2/2019  | van Petegem .......... | E21B 34/08 |
| 2009/0078428 | A1 | * | 3/2009  | Ali .......................... | E21B 43/12 |
|  |  |  |  |  | 166/373 |
| 2013/0048274 | A1 | * | 2/2013  | Schultz ................... | E21B 43/12 |
|  |  |  |  |  | 166/177.6 |

(Continued)

*Primary Examiner* — Matthew R Buck
(74) *Attorney, Agent, or Firm* — Cantor Colburn LLP

(57) ABSTRACT

An embodiment of a fluid control device includes a housing, a fluid channel defined within the housing, the fluid channel having a first surface and a second surface opposing the first surface and having an inlet, and a flow control body disposed in the fluid channel, the flow control body tapering toward the inlet. The body, in use, causing fluid flowing through the channel to diverge into at least a first path between the first surface and a first side of the body, and a second path defined by at least by the second side of the body. A geometry of the first path and the second path selected is based on a subcool of the fluid at a pressure of the fluid entering the fluid channel, and the geometry is selected to induce cavitation of the fluid to choke fluid flow through the fluid channel.

19 Claims, 10 Drawing Sheets

(56) References Cited

U.S. PATENT DOCUMENTS

| | | |
|---|---|---|
| 2016/0369571 A1 | 12/2016 | Banerjee |
| 2019/0178068 A1* | 6/2019 | Stolboushkin ...... E21B 43/2406 |
| 2021/0148204 A1 | 5/2021 | Stolboushkin et al. |

* cited by examiner

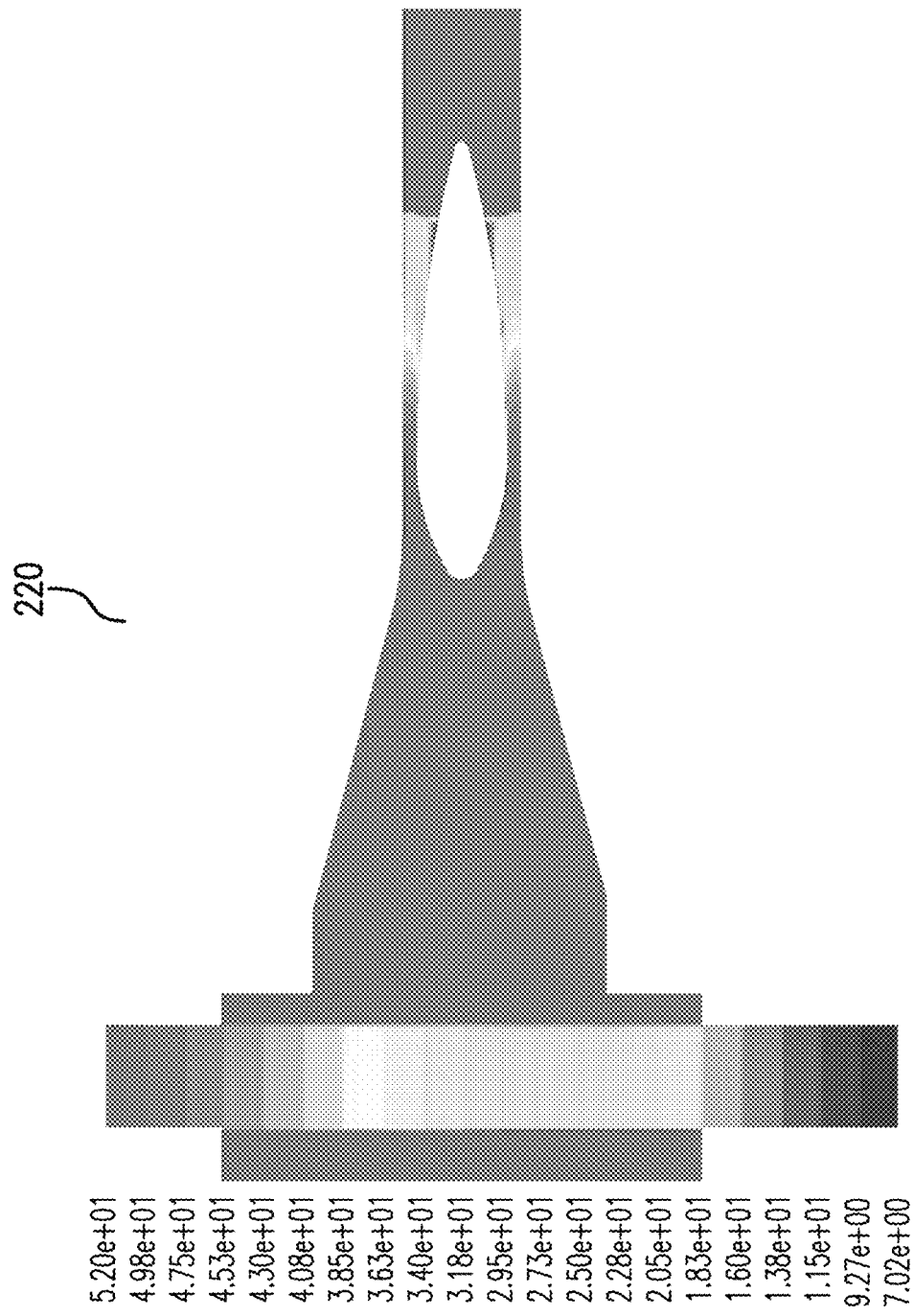

SELECTIVE FLOW CONTROL USING CAVITATION OF SUBCOOLED FLUID

CROSS REFERENCE TO RELATED APPLICATIONS

This application claims the benefit of U.S. Provisional Application No. 62/903,502 filed on Sep. 20, 2019, the disclosure of which is incorporated by reference herein in its entirety.

BACKGROUND

Some forms of energy production involve a number of diverse activities from various engineering fields to be performed in a borehole. For example, Exploration and production of hydrocarbons utilizes boreholes drilled into a resource bearing formation. Stimulation operations may be performed to facilitate hydrocarbon production from formations. Examples of stimulations include hydraulic fracturing, acid stimulation, steam injection, thermal injection and other operations that include injection of fluids and/or heat into a formation.

An example of a steam injection process is referred to as Steam Assisted Gravity Drainage (SAGD), which is a technique for recovering formation fluids such as heavy crude oil and/or bitumen from geologic formations, and generally includes heating a formation region through an injection borehole to reduce the viscosity of bitumen and allow it to flow into a recovery borehole. As used herein, "bitumen" refers to any combination of petroleum and matter in the formation and/or any mixture or form of petroleum, specifically petroleum naturally occurring in a formation that is sufficiently viscous as to require some form of heating or diluting to permit removal from the formation.

Other forms of energy production include geothermal production. Geothermal wells use heat present under the ground to extract usable energy. Water is pumped into the ground, absorbs energy, and is removed. The heat energy can be used for various purposes, such as driving turbines or otherwise generating electrical power.

SUMMARY

An embodiment of a fluid control device includes a housing, a fluid channel defined within the housing, the fluid channel having a first surface and a second surface opposing the first surface and having an inlet, and a flow control body disposed in the fluid channel, the flow control body tapering toward the inlet. The body, in use, causing fluid flowing through the channel to diverge into at least a first path between the first surface and a first side of the body, and a second path defined by at least by the second side of the body. A geometry of the first path and the second path selected is based on a subcool of the fluid at a pressure of the fluid entering the fluid channel, and the geometry is selected to induce cavitation of the fluid to choke fluid flow through the fluid channel.

An embodiment of a method of controlling fluid flow includes receiving fluid in a liquid state at an inlet of a fluid channel in a housing of a flow control device, the fluid channel defined within the housing, the fluid channel having a first surface and a second surface opposing the first surface, the fluid channel having a flow control body disposed in the fluid channel, the flow control body tapering toward the inlet. The method also includes causing, by the body, the fluid flowing through the channel to diverge into at least a first path between the first surface and a first side of the body, and a second path defined by at least by the second side of the body. A geometry of the first path and the second path is selected based on a subcool of the fluid at a pressure of the fluid entering the fluid channel, and the geometry is selected to induce cavitation of the fluid to choke fluid flow through the fluid channel.

BRIEF DESCRIPTION OF THE DRAWINGS

The following descriptions should not be considered limiting in any way. With reference to the accompanying drawings, like elements are numbered alike:

FIGS. 7A and 7B (collectively referred to as "FIG. 7") depict an example of fluid velocity and density through the flow control assembly of FIG. 4;

DETAILED DESCRIPTION

A detailed description of one or more embodiments of the disclosed apparatus and method are presented herein by way of exemplification and not limitation with reference to the Figures.

Figure 1:
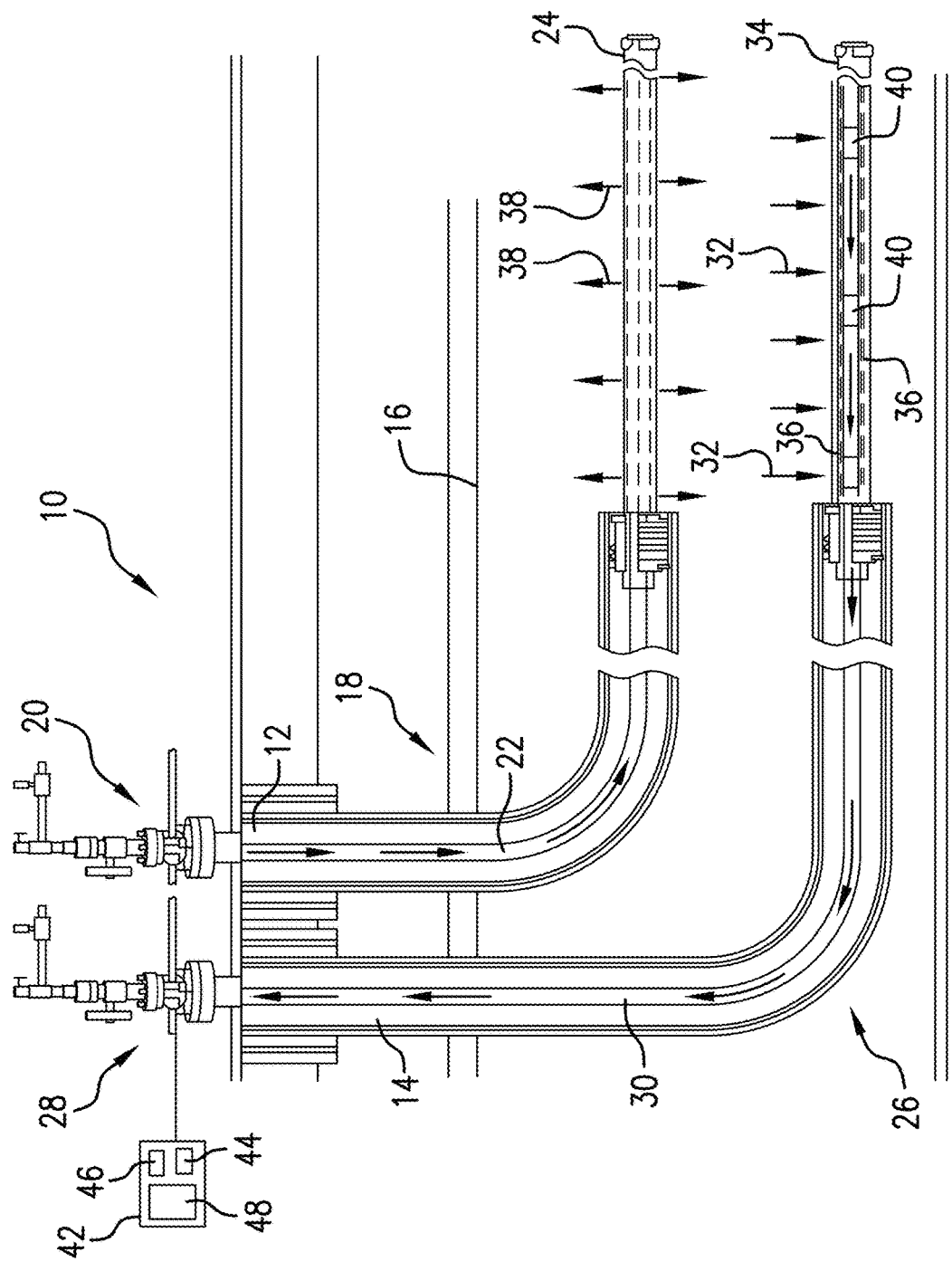
FIG. 1 depicts a resource recovery and exploration system configured for steam assisted gravity drainage (SAGD)

Referring to FIG. 1, an embodiment of a formation production system 10 includes a first borehole 12 and a second borehole 14 extending into a resource bearing formation such as an earth formation 16. In one embodiment, the formation is a hydrocarbon bearing formation or strata that includes, e.g., oil and/or natural gas. The first borehole 12 (also referred to as the injector borehole or injector well) includes an injection assembly 18 having an injection valve assembly 20, an injection conduit 22 and an injector 24. The injection valve assembly 20 is configured to introduce or inject a fluid (referred to as an injected fluid) such as a stimulation fluid, steam and/or hot water to the earth formation 16.

A production assembly 26 is disposed in the second borehole 14, and includes a production valve assembly 28 connected to a production conduit 30. The production conduit 30 is arranged radially inwardly of a casing 31. Production fluid 32, which may include hydrocarbons and other fluids (e.g., the injected fluid, water, non-hydrocarbon gases, etc.) flows into a collector 34 via a plurality of openings such as slots or holes, and flows through the production conduit 30 to a suitable container or other location. In one embodiment, the collector 34 includes a screen 36 (e.g., a sand screen) for preventing ingress of sand, particulates or other undesirable material.

In the embodiment of FIG. 1, the boreholes 12 and 14, the injector 24 and/or the collector 34 are disposed generally horizontally through a formation stratum, and can extend to various distances. However, embodiments described herein are not so limited, as the boreholes and/or components therein can extend along any selected path, which can include vertical, deviated and/or horizontal sections.

In one embodiment, the system 10 is configured as a steam injection system, such as a steam assisted gravity drainage (SAGD) system. SAGD methods are typically used to produce heavy oil (bitumen) from formations and/or layers, such as layers that are too deep for surface mining. The injected fluid in this embodiment includes steam 38, which is introduced into the earth formation 16 via the injector 24. The steam 38 heats a region in the formation, which reduces the viscosity of hydrocarbons therein, allowing the hydrocarbons to drain into the collector 34. For example, the injected steam condenses into a phase that includes a liquid water and hydrocarbon emulsion, which flows as a production fluid into the collector 34. A steam head (not separately labeled) may be maintained above the collector 34 to maintain the process of heating the region. Other embodiments of the system 10 may be configured to inject other fluids, such as hot water, surfactants, and/or petroleum products.

One or more flow control devices 40 are positioned at selected sections along the collector 34 to control the rate of fluid flow through the collector 34. Examples of flow control devices include active inflow control devices (ICDs), passive flow control devices, screens, valves, sleeves and others. Other components, such as packers, may be included in the collector 34 to establish production zones.

Surface and/or downhole components such as the injection valve assembly 20, the production valve assembly 28, the injector 24, the collector 34 and/or the flow control devices 40 may be in communication with a processing device, such as a downhole processor and/or a surface processing unit 42. For example, in SAGD systems, optical fibers can be incorporated into the injector 24 and/or the collector 34 for measurement and/or communication. The downhole processor and/or processing device includes components for performing functions including communication, measurement, data storage, data processing and/or control of steam and/or other fluid injection.

Various tools and/or sensors may be incorporated in the system. For example, one or more measurement tools can be deployed downhole for measuring parameters, properties or conditions of the borehole, formation and/or downhole components. Examples of sensors include temperature sensors, pressure sensors, flow measurement sensors, resistivity sensors, porosity sensors (e.g., nuclear sensors or acoustic sensors), fluid property sensors and others.

Although embodiments are discussed with reference to SAGD systems, they are not so limited and can be applied to any downhole system. For example, flow control devices as described herein may be utilized in geothermal energy extraction methods. One such method involves drilling two parallel horizontal boreholes. Cold fluid is injected into one borehole (the injector well) under pressure and migrates through a formation into another borehole (the producing well), from which the fluid is brought to the surface. As the fluid migrates into the producing well, it absorbs heat energy, and this heat energy is brought to the surface.

Natural differences in injection profile and reservoir conductivity can cause water (or other fluid) from the injector well to have uneven dwell times in the formation, resulting in water at the producer well having hot regions and cold regions. Cavitating flow control devices (e.g., inflow control devices including flow control bodies disposed within fluid channels) may be incorporated, for example, in the producer well to facilitate equalizing production. Flow control devices may be incorporated in the producer well at one or more production zones, and can passively increase and decrease flow to each zone and serve to even out the temperature profile. As discussed in more detail below, a cavitating inflow control device accelerates fluid, causing the static pressure to drop. When the static pressure drops to the saturation pressure for fluid of a given temperature, the mass flow rate is choked. In this way, hot spots can be suppressed by choking the inflow at that zone. This redirects fluid to adjacent zones.

Figure 2:
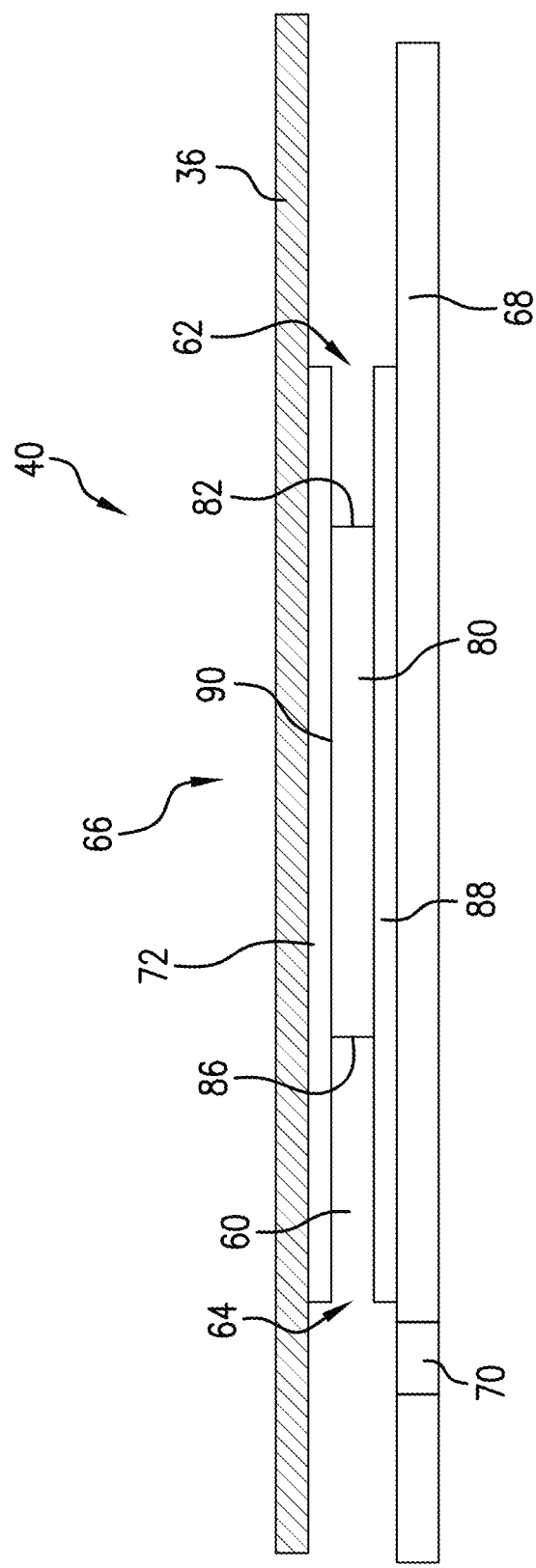
FIG. 2 depicts an embodiment of a flow control device including a flow control body disposed in a fluid channel.
Figure 3:
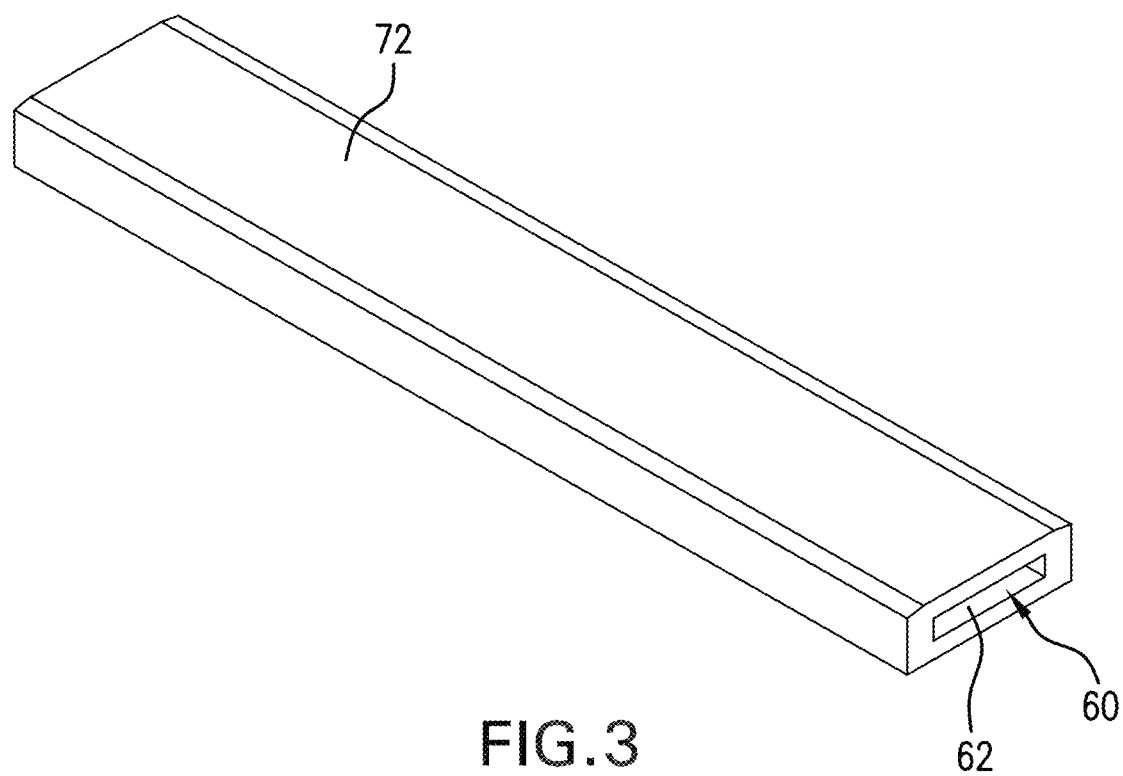
FIG. 3 is a perspective view of the fluid channel of FIG. 2.

Referring to FIGS. 2 and 3, an embodiment of the flow control device 40 includes a fluid channel 60 having an inlet 62 and an outlet 64. In one embodiment, the inlet 62 is in fluid communication with fluid in an annular region 66 of the second borehole 14 and the outlet is 64 in fluid communication with the production conduit 30. The flow control device 40, in one embodiment, is configured as an inflow control device (ICD) as part of a SAGD system. The flow control device 40 is not so limited, and can be utilized in conjunction with any energy industry system or other system for which fluid flow control is desired. An example of such a system is a geothermal energy recovery system.

As shown in FIGS. 2 and 3, the fluid channel 60 may be a flat channel that directs fluid along a linear or axial path. The fluid channel 60 is not so limited and define any fluid path, such as a curved, circumferential, circular, ring-shaped or spiral path.

In one embodiment, the flow control device 40 is disposed on a tubular in the collector 34, such as a base pipe 68. The flow control device 40 may be disposed on any suitable component, such as a coupling or production string. The base pipe 68 includes at least one fluid port 70.

The flow control device 40 may be attached or fixedly disposed on the base pipe 68 or other downhole component, or formed integrally with a downhole component. For example, as shown in FIG. 3, the fluid channel 60 is formed by a housing 72.

The flow control device 40 also includes a flow control body 80 having a leading end 82 that faces upstream relative to the direction of the flow of fluid 84 (e.g., the production fluid 32). The flow control body 80 also has a trailing end 86 facing downstream relative to the fluid flow direction 84

In the embodiment of FIGS. 2 and 3, the flow control body 80 is a flat plate configured to be inserted or otherwise disposed within the fluid channel 60 to control fluid flow based on fluid subcool temperature ("subcool"), as discussed further below. The flow control body 80 may have any other suitable shape. Also in the embodiment of FIGS. 2 and 3, the flow control body 80 is in contact with a lower wall 88 of the housing 72 and an upper wall 90 of the housing 72, so as to divert fluid flow along the sides of the fluid channel 60. In other embodiments, the flow control body 82 is separated from the upper wall 90 and/or the lower wall 88 by a selected tolerance and/or engage with the upper wall and/or the lower wall 88 to form a seal.

Figure 4:
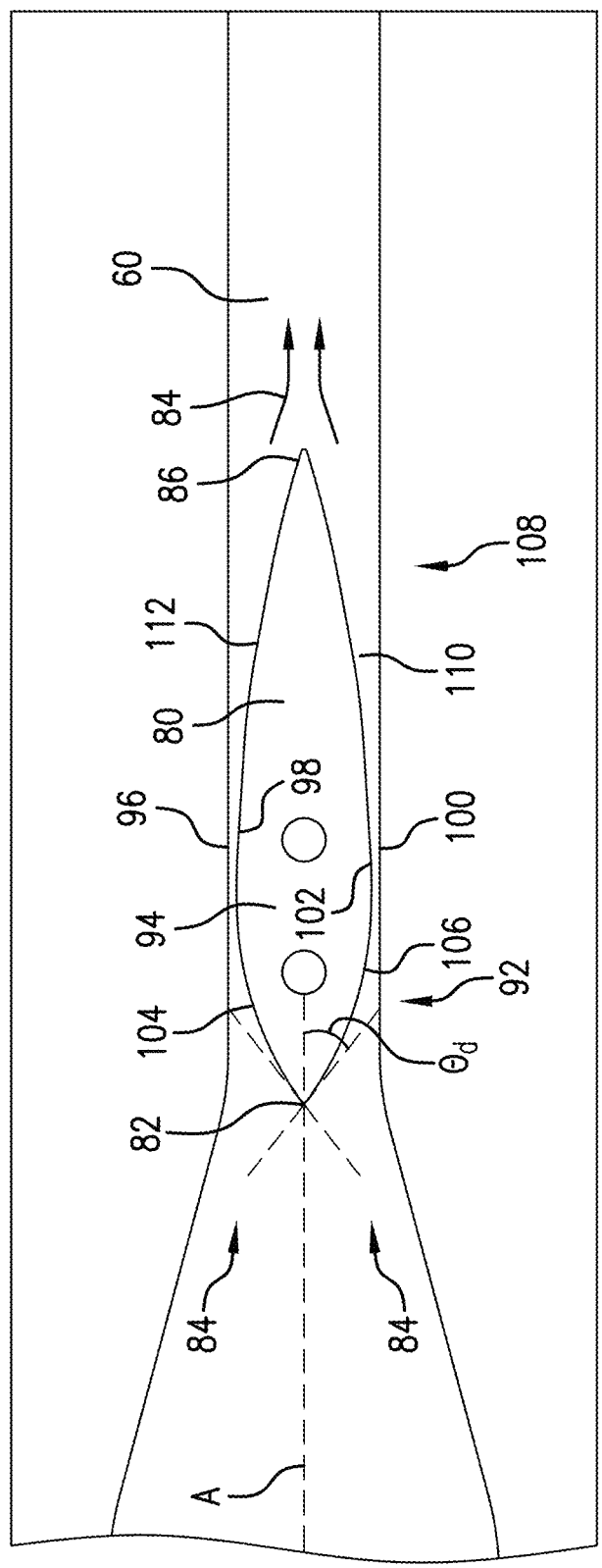
FIG. 4 depicts an embodiment of the flow control body of FIG. 2, which has an airfoil shape.

FIG. 4 shows an embodiment of the flow control body 80, which has a shape and size configured to selectively choke the flow rate of fluid 84 entering the flow control device 40. Such selective choking is based on subcool, which regulates the thermal conformance of the well, reduces the steam-oil ratio and thereby improves overall production. The "subcool" of a fluid refers to a fluid temperature relative to the saturation temperature of the fluid at a given fluid pressure. Saturation properties of the fluid can be represented by a saturation curve plotted as a function of temperature and pressure. A fluid that exists on the saturation curve has some combination of vapor (steam and gas) and liquid. Fluid above the saturation curve is entirely in the liquid state, and is referred to as subcooled liquid. A fluid that exists below the saturation curve is entirely in the gaseous state. Embodiments described herein cause fluid to cavitate by reducing the pressure of the fluid via a restriction or restricted path. The restriction causes fluid velocity to increase until the pressure falls to a value at the saturation curve for a given temperature. In order to cause cavitation, the restriction has a minimum size or throat size selected based on the measured or anticipated pressure and temperature of fluid flowing into the restriction.

The flow control body 80 (e.g., an integral part of the flow control device 40 or an insert configured to be inserted into or otherwise connected to the fluid channel 60) includes a diverging region 92 that extends from the leading end 82 toward a central portion 94. The diverging region 92 is configured to diverge or split the fluid 84 to follow a first restricted path in the fluid channel 60 between a side surface 96 of the fluid channel 60 and a side 98 of the flow control body. The diverging region 92 also causes the fluid 84 to follow a second restricted path in the fluid channel 60 between a side surface 100 of the fluid channel 60 and an opposing side 102 of the flow control body 80. It is noted that the flow control device 40 may be configured to define more than two flow paths. For example, multiple inserts or flow control bodies 80 may be disposed in the fluid channel 60, which can be arrayed axially along the fluid channel 60, arrayed circumferentially within the fluid channel 60 and/or co-located (in parallel) in the fluid channel 60. In another embodiment, the flow control device 40 can have multiple fluid channels 60, each having one or more flow control bodies 80.

The flow control body 80 causes the fluid 84 flowing through the restricted paths to increase in velocity and experience a localized pressure drop from an initial pressure of the fluid upstream of the flow control body 80 to a lower pressure. As the fluid exits the restricted paths, the fluid pressure recovers to the initial pressure or other pressure greater than the lower pressure.

The size of the restricted paths (e.g., cross-section area or width) is selected based on the initial pressure and a given fluid temperature so that the pressure drop is sufficient to make the fluid pressure in the restricted paths less than or equal to the saturation pressure of the fluid 84 at the given fluid temperature. The pressure drop causes fluid 84, which enters the fluid channel 60 in a liquid phase, to cavitate, resulting in a mixture of vapor and liquid. In one embodiment, the "size" of the restricted path refers to the size of the smallest part (the minimum size or throat) of the restricted path.

When the local pressure reaches a saturation pressure of the fluid 84, cavitation occurs and vapor is evolved in the fluid 84. The cavitation acts to limit or choke the fluid flow rate. The velocity of the fluid 84 in the restricted paths is limited to the sonic velocity of the fluid 84. As a mixture of liquid and vapor exhibits a smaller sonic velocity than either liquid or vapor phase alone, the smaller sonic velocity limits the flow rate. Downstream of the flow control body 80, the pressure of the fluid 84 recovers and velocity decreases, with the fluid 84 returning to the liquid phase as long as the downstream or drawdown pressure is above the saturation pressure of the fluid 84.

The various surfaces of the flow control body 80 that come into contact with the fluid 84 may have a selected roughness, so that the surfaces are smooth and do not significantly contribute to changing or reducing fluid velocity. For example, the surfaces can be polished or buffed to a selected roughness or coated with a material having a selected roughness. An example of the selected roughness is about 63 Root Mean Square (RMS) roughness or lower.

In one embodiment, the diverging region 92 includes opposing tapered sides that extend from the leading end 82 to the central portion 94. For example, as shown in FIG. 4, opposing tapered sides 104 and 106 cause a gradual increase in width of the flow control body 80 until the restricted paths have a selected size, resulting in a flow path that gradually decreases in size until the flow path reaches the throat. The tapered sides may cause a gradual increase and follow a selected angular path. The angular path can be characterized as, e.g., an average angle or angles of the sides from the point of minimum flow (throat) to a selected point at or near the central portion 94. For example, the tapered sides generally have an average angle $\theta_d$ relative to a central axis A of the fluid channel 60. An example of the angle $\theta d$ is about 10 to 25 degrees, such as about 18 degrees. In one embodiment, the tapered sides 104 and 106 extending from the leading edge 82 are convex.

The opposing tapered sides 104 and 106 may terminate at a point as shown in FIG. 2, or may form any suitable shape at the leading end 82. For example, the leading end 82 may form a flat surface or rounded surface at the termination of the body sides.

The flow control body 80 also includes a converging region 108 that extends from the central portion. The converging region directs fluid 84 exiting the restricted path downstream of the flow control body 80 and allows the fluid 84 to recombine. As the pressure recovers (e.g., to a pressure above the saturation pressure) and the fluid recombines, the fluid 84 is returned to the liquid phase.

In one embodiment, referring to FIG. 4, the converging region includes opposing tapered sides 110 and 112, each of which define an average angle $\theta_c$ relative to the axis A. The tapered converging sides 110 and 112 may terminate in a point, or in a different shape such as a flat portion or rounded portion.

The angle $\theta_c$ may be less than the diverging angle $\theta_d$, which provides for a longer converging region to allow for a relatively gradual pressure recovery. An example of the angle $\theta_c$ is about 10-25 degrees.

The tapered sides 104 and 106 and/or the tapered converging sides 110 and 112 may be straight or have any suitable shape. For example, the tapered sides 104 and 106 and/or 110 and 112 can be straight, concave or convex. In one embodiment, shown in FIG. 4, the flow control body has an airfoil shape including the tapered convex diverging region 92, and a convex tapered converging region. It is noted that, although the side surfaces 96 are shown as being straight, they are not so limited and can follow a tapered or non-linear path. For example, the side surfaces 96 can be tapered such that the width of the fluid channel 60 gradually increases.

Figure 5:
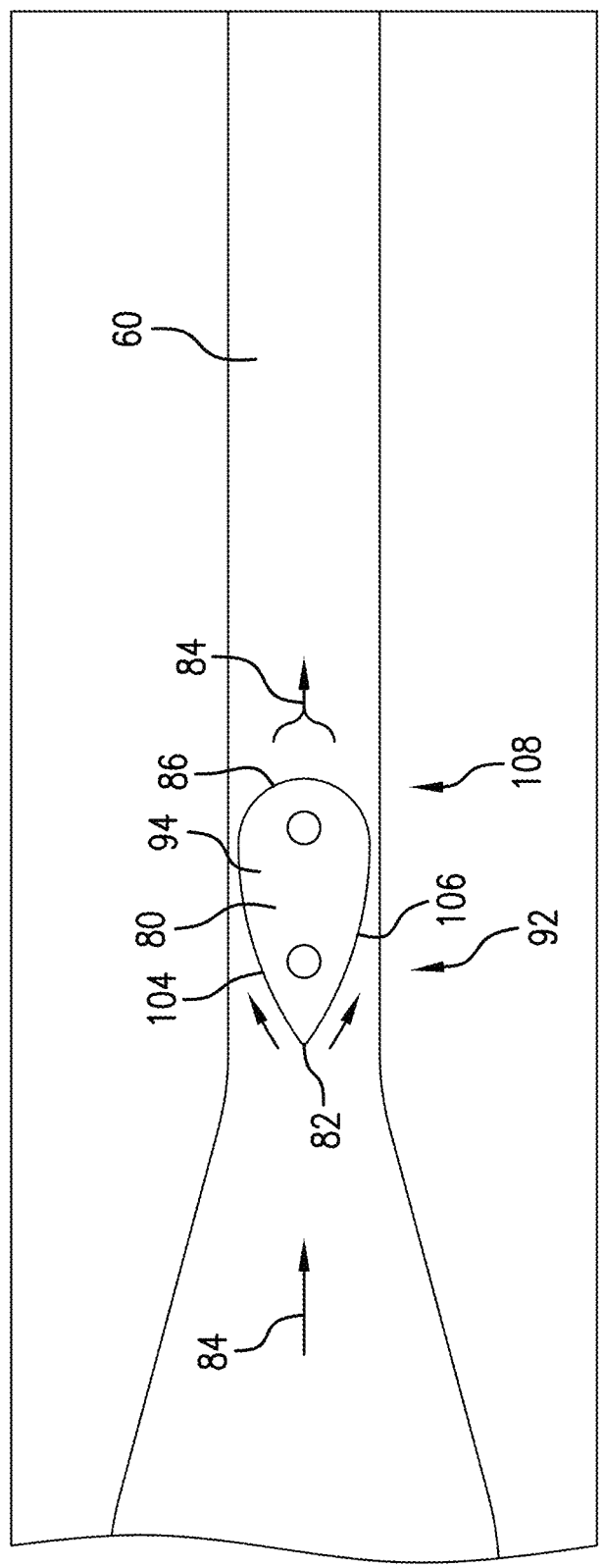
FIG. 5 depicts an embodiment of the flow control body of FIG. 2, which has a tapered leading end and a rounded trailing end.

In one embodiment, shown in FIG. 5, the converging region 108 has a length that is less than the diverging region 92 to allow fluid to converge more quickly than the embodiment of FIG. 4. For example, as shown in FIG. 5, the converging region 108 has a generally circular or arcuate shape forming a relatively blunt end. In this embodiment, the flow control body 108 has a teardrop or similar shape having a rounded end and a tapered diverging end (either convex, straight or concave).

The relatively blunt flow control body 80 of FIG. 5 allows for a larger restriction to be imposed geometrically for the purpose of limiting flow rate. While the minimum size of the restriction or restricted path, and thus the fluid velocity, governs the onset of cavitation choking, the geometry of the flow control body 80 affects the flow rate at a given differential pressure in the subcool region. By utilizing a blunter configuration, the flow control device 80 of FIG. 5 can be controlled given the same minimum flow rate as the device of FIG. 4.

For example, the flow control body 80 of FIG. 5 may exhibit higher frictional and/or geometric losses due to the relatively blunt converging region, which can be taken into account and used to limit flow rate in conjunction with the flow rate limits imposed by cavitation. In addition, the relatively blunt converging region may result in fluid turbulence, which can be used to limit fluid flow.

Figure 6:
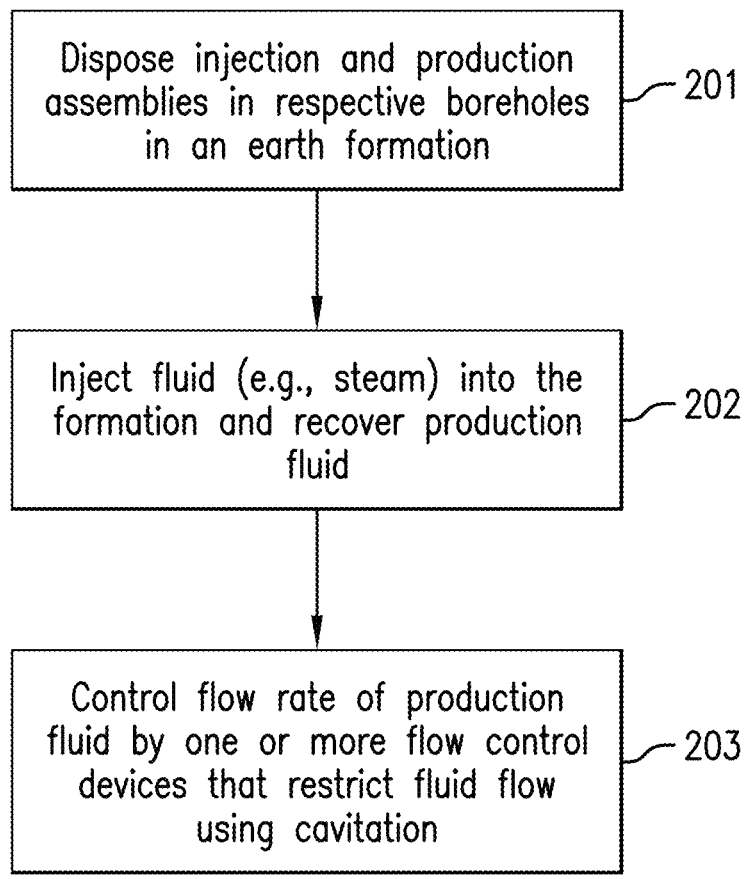
FIG. 6 is a flow diagram depicting an embodiment of a method of production by a resource recovery and production system.

Referring to FIG. 6 and with continued reference to FIG. 1, a method 200 of producing a target resource such as hydrocarbons from a resource bearing formation includes one or more stages 201-203. In one embodiment, the method 200 includes the execution of all of stages 201-203 in the order described. However, certain stages may be omitted, stages may be added, or the order of the stages changed. Although the method 200 is described in conjunction with the system 10 and the injection and production assemblies described herein, the method 200 may be utilized in conjunction with any production system that incorporates injection of fluids for facilitating production.

In the first stage 201, the injection assembly 18 is disposed in the first borehole 12, and advanced through the first borehole 12 until the injector 24 is located at a selected location. The production assembly 26 is disposed in the second borehole 14, and advanced through the second borehole 14 until the collector 34 is positioned at a selected location. In one embodiment, the selected location is directly below, along the direction of gravity, the injector 24.

In the second stage 202, a fluid is injected into a region of the formation surrounding the first borehole 12 via the injection assembly 18 to facilitate production. Examples of injected fluid include water, steam, hydrocarbons, hot water, brine, acid, hydraulic fracturing fluid, gases and thermal fluids. In an embodiment, the injected fluid is steam, which is injected to reduce a viscosity of hydrocarbon material such as bitumen. The hydrocarbon material migrates with the force of gravity to a region of the formation surrounding the second borehole 14, and is recovered as production fluid through openings 72 in collector 34.

In the third stage 203, the flow rate of production fluid entering the collector 34 is controlled by one or more flow control devices 40 based on the subcool of production fluid as described above. For example, the collector 34 includes one or more flow control devices 40 including one or more flow control bodies 80, such as the flow control body of FIG. 4 or FIG. 5. The flow control devices 40 may be incorporated in one or more inflow control devices (ICDs), such as an autonomous ICD that reacts to fluid subcool conditions.

It is noted that multiple flow control devices 40 can be located with the collector. For example, multiple flow control devices 40 can be arrayed circumferentially and/or longitudinally along the collector 34. The multiple flow control devices may have the same or similar configuration to choke fluid flow at a temperature or temperatures at the collector 34. Alternatively, different flow control devices 40 can have flow control bodies with different configurations. For example, temperature and/or pressure may vary along the collector 34. The flow control devices 40 can thus have different configurations (e.g., different minimum sizes of the restricted fluid paths) in order to choke fluid flow by a selected amount at different temperatures and/or pressures.

The flow control device 40 redirects heat to create even thermal profiles, reducing steam-generating hotspots and sending heat to low-producing cold zones. In addition, the flow control device 40 can operate completely in the subcool regime, so that there is no need to have vapor in the production fluid prior to entering the flow control device 40 to achieve a choking effect.

The following is a description of various example configurations of the flow control device 40 and the flow control body. These examples illustrate how controlling the size of the restricted path based on fluid subcool temperature effectively controls fluid flow rates.

In the following examples, the flow control device 40 includes an airfoil shape flow control body 80 as shown in FIG. 5. The fluid channel 60 has a width of about 0.75 inches. Fluid entering the channel 60 has a temperature of about 430 degrees F., operating at 5 degrees F. subcool (5 degrees F. below the saturation temperature). The inlet pressure of fluid including fluid from an earth formation is about 382.18 psi, and the outlet pressure from the flow control device 40 is about 362.18 psi (about 20 psi differential pressure).

In a first example, the flow control body 40 is shaped and sized so that the minimum or smallest width of each restricted fluid path is about 0.10 inches. In this example, the maximum flow rate through the restricted section due to cavitation is about 1.969 lbm/s (53.6 kg/min)

Figure 7A:
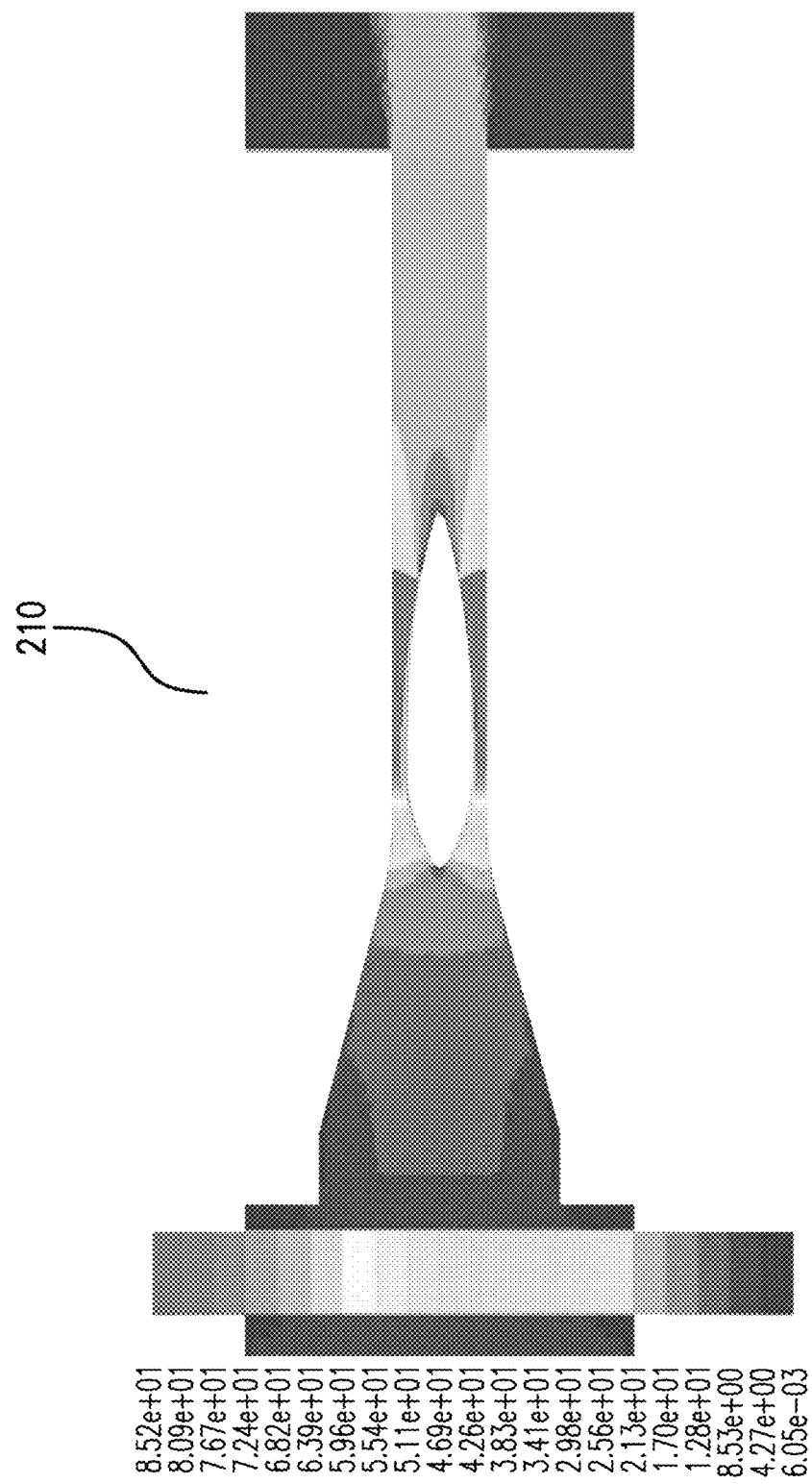

FIG. 7 shows the behavior of fluid flowing through the flow control device of FIG. 5 according to another example. In this example, the minimum or smallest width of each restricted path is about 0.075 inches. As with the previous example, flow rate is limited to about 1.969 lbm/s (53.6 kg/min). FIG. 7A is a velocity map 210 that shows the changes in velocity as fluid flows through the restricted paths, experiences cavitation and is recombined. As shown, velocity increases as fluid flows through the restricted paths, reaches and maintains a critical velocity—the sonic velocity of the vapor-liquid mixture—in the diverging fluid flow paths, and then, fully in the liquid state, slows around the trailing edge until recombination.

FIG. 7B is a density map 220 showing the change in fluid density over the flow path. The onset of vapor propagation is seen just after the minimum flow area point, seen in the sharp decrease in fluid density. As the flow area recovers the density increases, as the mixture changes phase back towards being entirely liquid, seen just before the trailing edge of the flow control body 80.

Figure 8:
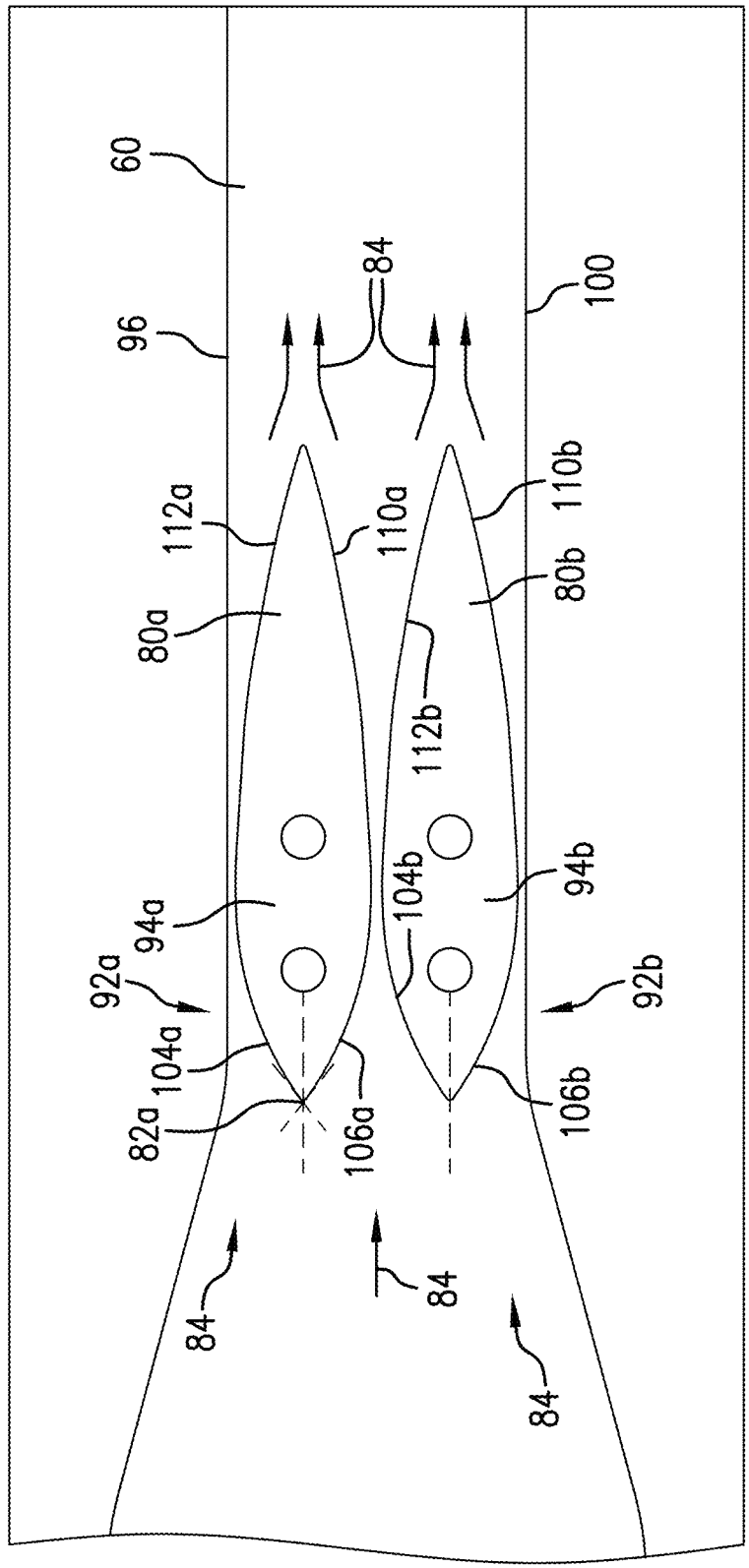
FIG. 8 depicts an embodiment of a flow control device including a plurality of flow control bodies disposed in a fluid channel.

As noted above, the fluid channel 60 can have multiple flow control bodies disposed within the fluid channel 60, such as co-located (in parallel) flow control bodies and/or axially arrayed flow control body (in series). FIG. 8 depicts an example of the flow control device 40, which includes a first flow control body 80a and a second flow control body 80b. The flow control bodies 80a and 80b may have a similar size and/or shape as the flow control body of FIG. 4, but are not so limited.

The first flow control body 80a includes a diverging region 92a including tapered sides 104a and 106a that extend from a leading end 82a toward a central portion 94a. The flow control body 80a also includes a converging region 108a that includes opposing tapered sides 110a and 112a that extend from the central portion 94a to a trailing end 86a.

Likewise, the second flow control body 80b includes a diverging region 92b including tapered sides 104b and 106b that extend from a leading end 82b toward a central portion 94b. The flow control body 80b has a converging region 108a including opposing tapered sides 110b and 112b that extend from the central portion 94b to a trailing end 86b.

As shown, the flow control device 40 in this embodiment defines multiple fluid paths, i.e., a fluid path between the first flow control body 80a and the side 96, a fluid path between the first flow control body 80a and the second flow control body 80b, and a fluid path between the second flow control body 80b and the side 100. Each of the fluid paths has a minimum size or throat configured to cause cavitation and choke flow as discussed above.

The goal of subcool control is to provide very little restriction until fluid entering the flow control device 40 is at a low subcool (e.g., a subcool of about 2 degrees or less). When the fluid is at low subcool, it is desirable to increase the pressure drop through the flow control device 40 to improve thermal conformance and maximize liquid production throughout the borehole.

For each production zone, there is a total pressure drop from the reservoir, through the screen (if present), through the flow control device 40 (e.g., an ICD), and to production tubing. Surface fluid control and/or an Electric Submersible Pump (ESP) are used to reduce and control the borehole pressure and create a sufficient pressure drop from the steam chamber/reservoir in the formation to cause the fluids to flow from the reservoir to the production tubing.

In order to cause cavitation and cavitation choking of the produced fluid, the pressure of the fluid flowing through the flow control device 40 (and the flow paths) is reduced to the vapor pressure of the fluid at the inlet temperature. The reduction of pressure is a result of the increase in velocity through the device as the flow area decreases. The velocity must reach the critical velocity, which occurs as the fluid is changing phase—the fluid must completely vaporize to steam before the pressure can depart the saturation curve.

The geometry and dimensions of the flow control device 40 (including the flow control body and the fluid channel) are selected for a target range of flow rates at the flow control device input, and designed based on the anticipated reservoir pressure, the anticipated temperature at the flow control device, and the subcool (the difference between the saturation temperature and production fluid temperature) at which the system 10 is operated. Examples of a subcool at which the system is operated include 0, 1, and 2° C. The subcool at which the system is operated determines the total pressure available for the flow control device 40 (e.g., an ICD).

In addition, the flow control device 40 is designed such that the pressure drop through the flow control device 40 is sufficient to allow the fluid to reach the critical velocity (the fluid velocity at which the pressure equals the vapor pressure of the fluid at the given temperature) within the limits of the total pressure drop that can be achieved by the system 10. The critical velocity is defined by the upstream pressure, vapor pressure (saturation pressure), and minimum flow area.

The total pressure drop from the reservoir to the production tubing is limited by the reservoir/steam chamber pressure, the borehole pressure, and frictional losses along the length of the production tubing which are a function of the flow rates. Thus, there is a limit to the pressure drop that can be achieved; at some point, increasing the drawdown (e.g., by pulling harder with the ESP) will not result in a significant increase of the flow rate through the device.

In order to accelerate the fluid to reach the critical velocity in the device, there must a sufficient pressure drop through the device. This can be accomplished by having a small flow area free of any obstacles, or with a body/feature (e.g., the flow control body 80) disposed inside the flow path of the flow control device 40. The flow control device 40 is thus designed to have a minimum fluid path size that will result in a desired pressure drop across the device. In addition, the tapered design and/or taper angle as described above is selected to provide a low-drag flow control device that can allow for an increase in velocity to the critical velocity using a minimum size that is greater than the minimum size of the restriction alone. For example, the smooth taper of the flow control body 40 up to the throat allows for limiting the frictional pressure drop and allowing for a greater velocity than would otherwise be achievable.

Features such as the rounded back edge of an embodiment of the flow control device 40 help keep the device short and cost effective while maintaining a smooth profile. Due to the size of the minimum flow area, flow separation from the body may be expected at almost all relevant flow rates; the body would have to be prohibitively long in order to prevent flow separation.

Using computational and/or analytical models, the device can be designed and the size of the restriction selected such that the critical velocity (at a static pressure on the saturation curve) is reached in the operating subcool range (e.g., low subcool range such as 1-2° C.) at the target flowrate(s). As such, hotter zones will see more restriction as the fluid approaches the saturation curve. This will redirect the heat and improve the thermal conformance of the well, and it will select for relatively cooler fluid. Examples of design features include the minimum size of the flow path(s), the length of the flow control body 80, the taper angle, and materials or coatings that reduce drag.

Figure 9:
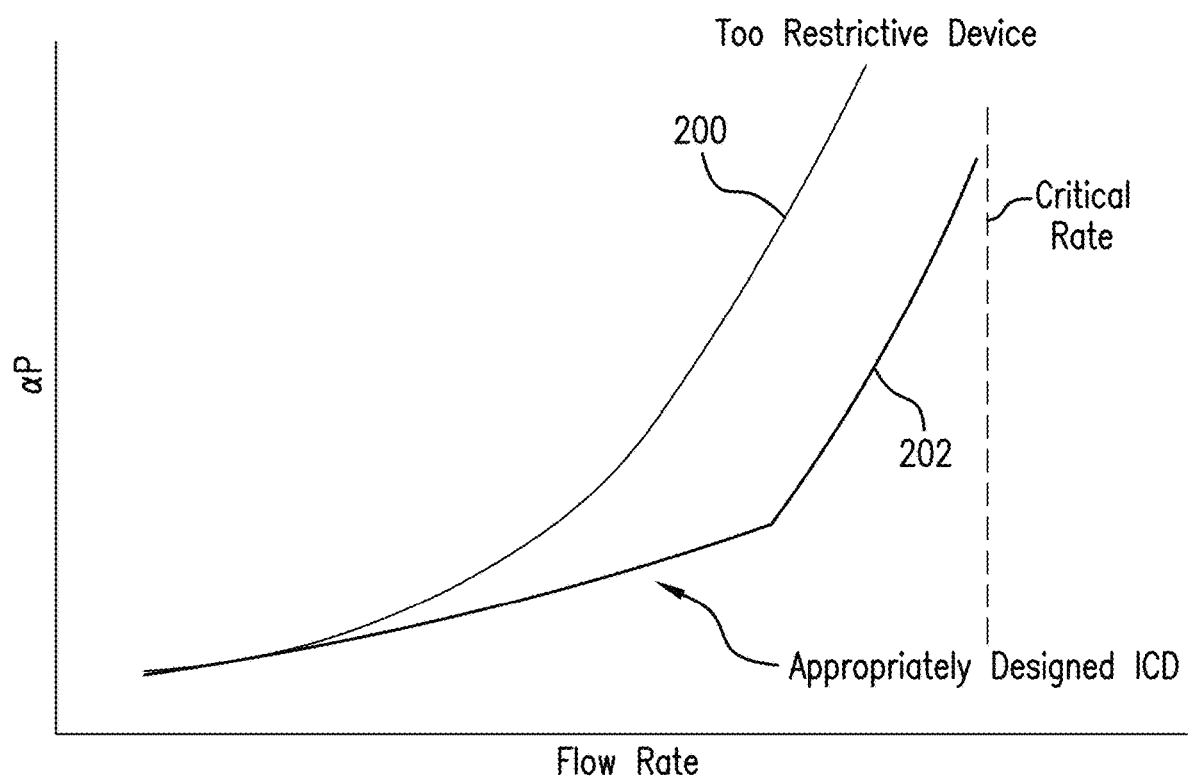
FIG. 9 depicts an example of a flow performance curve associated with a SAGD production conduit, and illustrates considerations involved in designing a flow control body according to embodiments described herein.

FIG. 9 depicts an example of flow performance characteristics of a production borehole (e.g., the borehole 14), and illustrates the design considerations discussed above. The flow performance characteristics are represented by curves that show flow rate as a function of differential pressure (the pressure drop through a flow control device) and flow rate.

If the flow performance curve (curve 200) of the device is too restrictive (i.e., the minimum size is too small), the pressure drop through the device required to reach the critical velocity may be greater than the available pressure, and thus the critical rate will not be reached. Conversely, if the device has too little restriction, the reservoir cannot supply sufficient flow rate to allow the ICD to reach the critical rate.

In addition, if the device induces too much frictional pressure drop, either through geometry constraints or roughness, the frictional pressure drop will dominate and prevent reaching the critical flow rate at all.

The flow control device 40 as described herein is able to cause the fluid to reach the critical velocity without requiring a pressure drop that is larger than what can be supplied by a production system (e.g., the system 10). As shown in FIG. 5, the performance curve 202 using the flow control device described herein, allows for reaching the critical velocity with a comparably smaller total pressure drop.

In one embodiment, a fluid simulation program or software is employed to simulate fluid flow as part of a method of designing the geometry and dimensions of the flow control device 40. For example, computational fluid dynamics (CFD) simulations can be used. As part of the CFD simulation, a two dimensional setup with pressure inlets and outlets and a single phase model can be constructed to analyze the overall performance of selected designs. By choosing a sweep of differential pressures and monitoring the mass flow rate and minimum static pressures, performance can be compared across multiple device designs. The single phase model can be used to visualize the location(s), differential pressure(s) and flow rate(s) at which cavitation would occur, by comparing the static pressures to the vapor pressure at desired temperature(s). The appearance of a static pressure below the vapor pressure would indicate that the fluid would evolve some steam fraction, as the static pressure of a fluid cannot pass the saturation curve without first completely changing phase. By performing these sweeps at pressures at temperatures representative of operating conditions (e.g., SAGD and/or geothermal conditions), it can be determined, for a given design, which flow rates and subcools would begin to cavitation choke. Through these simulations, it has been found that a smooth taper to the throat helps to maximize flow rate in the subcooled liquid state. The downstream end of the flow control device was also investigated (e.g., using CFD simulation), and it was found that a smooth, rounded shape at the trailing end was as effective as a long, drawn out taper (e.g., as in the shape of a wing). The smooth, rounded end helped cut down on the length, and therefore the cost, of the device, as only a very, very shallow taper would have prevented fluid separation at the desired flow rates.

Another method of designing the flow control device includes visualizing cavitation and its effects on flow rate for selected designs, which includes performing multiphase flow simulations and cavitation models embedded in the CFD software. These models showed clear choking effects when the static pressure (around the throat) fell to the vapor pressure, and sharp changes in the density of the fluid were evident. In one embodiment, this method was used on designs that had been previously vetted with the single phase setup to save time and computational resources.

Embodiments described herein present a number of advantages and technical effects. SAGD wells suffer from steam breakthrough issues due to thermal non-conformance in the reservoir, due to a number of factors. This produced steam damages downhole equipment and limits the rate at which hydrocarbons can be produced. Embodiments described herein provide for controlling or choking flow based on subcool, which regulates the thermal conformance of a well and reduces the steam-oil ratio, thereby improving overall production. In addition, embodiments described herein can be manufactured more easily and take up less space than typical flow control devices and systems.

Set forth below are some embodiments of the foregoing disclosure:

Embodiment 1: A fluid control device comprising: a housing; a fluid channel defined within the housing, the fluid channel having a first surface and a second surface opposing the first surface and having an inlet; and a flow control body disposed in the fluid channel, the flow control body tapering toward the inlet; the body, in use, causing fluid flowing through the channel to diverge into at least a first path between the first surface and a first side of the body, and a second path defined by at least by the second side of the body, a geometry of the first path and the second path selected based on a subcool of the fluid at a pressure of the fluid entering the fluid channel, the geometry selected to induce cavitation of the fluid to choke fluid flow through the fluid channel.

Embodiment 2: The device of any prior embodiment, wherein the second path is defined by the second side of the body and the second surface of the fluid channel.

Embodiment 3: The device of any prior embodiment, wherein the geometry includes a minimum size of the first path and the second path, and the minimum size is selected to cause fluid pressure to drop from an anticipated pressure of the fluid to a lower pressure that is less than a saturation pressure of the fluid at a downhole temperature.

Embodiment 4: The device of any prior embodiment, wherein at least one of the first side and the second side have a surface roughness that is less than a threshold roughness, the threshold roughness selected to maintain fluid velocity to a level sufficient to achieve cavitation.

Embodiment 5: The device of any prior embodiment, wherein the flow control body has opposing leading tapered sides extending from a leading end facing upstream relative to a fluid flow direction toward a central region of the flow control body.

Embodiment 6: The device of any prior embodiment, wherein the flow control body has an airfoil shape.

Embodiment 7: The device of any prior embodiment, wherein the leading tapered sides converge to a point at the leading end.

Embodiment 8: The device of any prior embodiment, wherein the flow control body includes opposing trailing convex sides extending from the central region toward a trailing end facing downstream relative to the fluid flow direction.

Embodiment 9: The device of any prior embodiment, wherein the flow control body includes a diverging region extending from the leading end to a central region of the flow control body, and a converging region extending from the central region.

Embodiment 10: The device of any prior embodiment, wherein the flow control body defines a rounded shape at the trailing end.

Embodiment 11: The device of any prior embodiment, wherein the fluid control device is part of at least one of a steam assisted gravity drainage (SAGD) system and a geothermal system.

Embodiment 12: A method of controlling fluid flow, comprising: receiving fluid in a liquid state at an inlet of a fluid channel in a housing of a flow control device, the fluid channel defined within the housing, the fluid channel having a first surface and a second surface opposing the first surface, the fluid channel having a flow control body disposed in the fluid channel, the flow control body tapering toward the inlet; AJND causing, by the body, the fluid flowing through the channel to diverge into at least a first path between the first surface and a first side of the body, and a second path defined by at least by the second side of the body, a geometry of the first path and the second path selected based on a subcool of the fluid at a pressure of the fluid entering the fluid channel, the geometry selected to induce cavitation of the fluid to choke fluid flow through the fluid channel.

Embodiment 13: The method of any prior embodiment, further comprising causing, by the body, the fluid in the first path and the second path to converge the fluid into the fluid path downstream of the flow control body, and outputting the fluid to a production conduit in the borehole.

Embodiment 14: The method of any prior embodiment, wherein the second path is defined by the second side of the body and the second surface of the fluid channel.

Embodiment 15: The method of any prior embodiment, wherein at least one of the first side and the second side have a surface roughness that is less than a threshold roughness, the threshold roughness selected to maintain fluid velocity to a level sufficient to achieve cavitation.

Embodiment 16: The method of any prior embodiment, wherein the opposing leading tapered sides include opposing leading convex sides extending from a leading end facing upstream relative to a fluid flow direction toward a central region of the flow control body.

Embodiment 17: The method of any prior embodiment, wherein the flow control body has an airfoil shape.

Embodiment 18: The method of any prior embodiment, wherein the leading convex sides converge to a point at the leading end.

Embodiment 19: The method of any prior embodiment, wherein the flow control body includes opposing trailing convex sides extending from the central region toward a trailing end facing downstream relative to the fluid flow direction.

Embodiment 20: The method of any prior embodiment, wherein the fluid control device is part of at least one of a steam assisted gravity drainage (SAGD) system and a geothermal system.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid control device comprising:
   a housing;
   a fluid channel defined within the housing, the fluid channel having a first surface and a second surface opposing the first surface and having an inlet; and
   a flow control body disposed in the fluid channel, the flow control body tapering toward the inlet;
   the body, in use, causing fluid flowing through the channel to diverge into at least a first path between the first surface and a first side of the body, and a second path defined by at least by the second side of the body, a geometry of the first path and the second path selected based on a subcool of the fluid at a pressure of the fluid entering the fluid channel, the geometry selected to induce cavitation of the fluid to choke fluid flow through the fluid channel, the geometry including a minimum size of the first path and the second path, the minimum size selected to cause fluid pressure to drop from an anticipated pressure of the fluid to a lower pressure that is less than a saturation pressure of the fluid at a downhole temperature.

2. The device of claim 1, wherein the second path is defined by the second side of the body and the second surface of the fluid channel.

3. The device of claim 1, wherein at least one of the first side and the second side have a surface roughness that is less than a threshold roughness, the threshold roughness selected to maintain fluid velocity to a level sufficient to achieve cavitation.

4. The device of claim 1, wherein the flow control body has opposing leading tapered sides extending from a leading end facing upstream relative to a fluid flow direction toward a central region of the flow control body.

5. The device of claim 4, wherein the flow control body has an airfoil shape.

6. The device of claim 4, wherein the leading tapered sides converge to a point at the leading end.

7. The device of claim 4, wherein the flow control body includes opposing trailing convex sides extending from the central region toward a trailing end facing downstream relative to the fluid flow direction.

8. The device of claim 7, wherein the flow control body includes a diverging region extending from the leading end to the central region of the flow control body, and a converging region extending from the central region.

9. The device of claim 8, wherein the flow control body defines a rounded shape at the trailing end.

10. The device of claim 1, wherein the fluid control device is part of at least one of a steam assisted gravity drainage (SAGD) system and a geothermal system.

11. A method of controlling fluid flow, comprising:
   receiving fluid in a liquid state at an inlet of a fluid channel in a housing of a flow control device, the fluid channel defined within the housing, the fluid channel having a first surface and a second surface opposing the first surface, the fluid channel having a flow control body disposed in the fluid channel, the flow control body tapering toward the inlet; and
   causing, by the body, the fluid flowing through the channel to diverge into at least a first path between the first surface and a first side of the body, and a second path defined by at least by the second side of the body, a geometry of the first path and the second path selected based on a subcool of the fluid at a pressure of the fluid entering the fluid channel, the geometry selected to induce cavitation of the fluid to choke fluid flow through the fluid channel, the geometry including a minimum size of the first path and the second path, the minimum size selected to cause fluid pressure to drop from an anticipated pressure of the fluid to a lower pressure that is less than a saturation pressure of the fluid at a downhole temperature.

12. The method of claim 11, further comprising causing, by the body, the fluid in the first path and the second path to converge the fluid into the fluid path downstream of the flow control body, and outputting the fluid to a production conduit in a borehole.

13. The method of claim 11, wherein the second path is defined by the second side of the body and the second surface of the fluid channel.

14. The method of claim 11, wherein at least one of the first side and the second side have a surface roughness that is less than a threshold roughness, the threshold roughness selected to maintain fluid velocity to a level sufficient to achieve cavitation.

15. The method of claim 11, wherein the body includes opposing leading convex sides extending from a leading end facing upstream relative to a fluid flow direction toward a central region of the flow control body.

16. The method of claim 15, wherein the flow control body has an airfoil shape.

17. The method of claim 15, wherein the leading convex sides converge to a point at the leading end.

18. The method of claim 15, wherein the flow control body includes opposing trailing convex sides extending from the central region toward a trailing end facing downstream relative to the fluid flow direction.

19. The method of claim 11, wherein the fluid control device is part of at least one of a steam assisted gravity drainage (SAGD) system and a geothermal system.

\* \* \* \* \*